2,957,036
PROCESS FOR PREPARING DIISOPROPENYLDIPHENYL AND HOMOLOGS THEREOF

Richard L. Markus, Montclair, N.J., assignor to White Laboratories, Inc., Kenilworth, N.J., a corporation of New Jersey No Drawing. Filed July 11, 1957, Ser. No. 671,127

11 Claims. (Cl. 260—668)

This invention is an improved process for preparing p,p'-diisopropenyldiphenyl and those homologs thereof wherein the phenyl groups are separated by an alkylene bridge, which bridge may be straight or branched chain. These compounds have the formula—

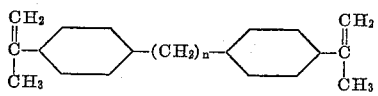

wherein $n$ is a cardinal number i.e. zero or an integer.

p,p'-Diisopropenyldiphenyl is a known compound first described by Valyi, Janssen and Mark in J. Phys. Chem. 49, 461–471(1945), which has been used as long chain cross-linking agent for the cross-linking of polystyrene. The diisopropenyldiphenylalkylenes are believed to be novel, and are useful for the same purposes as the known compound.

The known compound is believed to have been prepared by Valyi et al. by the following process: (1) The Friedel-Crafts acetylation of biphenyl to yield p,p'-diacetyldiphenyl as described by Long and Henze, JACS 63:1939–1940 (1941); (2) The Grignard methylation of p,p'-diacetyldiphenyl followed by hydrolysis to yield p,p'-di-(alpha-hydroxy)isopropyldiphenyl; (3) The dehydration of p,p'-di-(alpha-hydroxy)isopropyldiphenyl with acetic anhydride to form the product, p,p'-diisopropenyldiphenyl, followed by the isolation and washing of the crude product, and finally purification of the crude product by high vacuum sublimation.

While greatly improved yields of diacetyldiphenyl have been obtained by carrying out the Friedel-Crafts acetylation of biphenyl at temperatures below about 7 degrees centigrade, the present invention is primarily concerned with an improvement in the final step of obtaining pure p,p'-diisopropenyldiphenyl from p,p'-di-(alpha-hydroxy)-isopropyldiphenyl. The art method of performing the double dehydration of the two tertiary alcohol moieties of the molecule and the final purification of the product, which is a highly reactive cross-linking agent, involves a tedious and expensive series of steps. Further, in repeating the art method, the high vacuum sublimation of the crude product did not work well on quantities larger than one gram and was not well adapted to large scale production.

It was unexpectedly found that the two tertiary alcohol moieties of the molecule may be dehydrated by heating in the presence of an inert high-boiling non-peroxide forming hydrocarbon suspending medium, such as Shell "140" solvent (boiling range 185–212 degrees centigrade), Kensol "48", et cetera, at a temperature slightly above the boiling point of the inert suspending medium, which inert suspending medium serves to remove the water as formed. When the dehydration is complete, the inert hydrocarbon suspending medium is displaced gradually by the slow addition of preheated anhydrous ethylene glycol. The ethylene glycol is preferably preheated close to its own atmospheric boiling point. The ethylene glycol, which is highly stable, high-boiling alcohol, apparently performs a complex role in this reaction in that it permits the removal of the inert hydrocarbon residue by azeotropic distillation; completes the dehydration of the di-tertiary alcohol moieties by withdrawing any residual amounts of water; and, since it is a poor solvent of the diisopropenylphenyl end-product, it also carries over the end product by azeotropic distillation in a high grade of purity.

It has been found desirable (as a preferred embodiment of my process) to add a small amount of a polymerization inhibitor, such as 2, 6-di-tert-butyl-para-cresol, to the di-(alpha-hydroxy)isopropyldiphenyl and to the ethylene glycol. Omission of the polymerization inhibitor leads to inferior yields. While good yields were obtained by use of the anhydrous ethylene glycol, a preferred version of the new process involves the addition, with the ethylene glycol, of a heat-stable poly-alcohol, such as mannitol, which has the effect of reducing the limited solubility of the desired diisopropenyldiphenyl in boiling ethylene glycol to a minimum, thus permitting the azeotropic removal of the diisopropenyldiphenyl from the reaction zone at an appreciably faster rate. Even better results are obtained by adding with the ethylene glycol, in place of the heat-stable polyalcohol, a heat stable and recoverable anhydrous inorganic salt soluble in ethylene glycol, some examples of which are lithium chloride, potassium chloride and calcium chloride (listed in order of preference). The anhydrous inorganic salt is mixed with the ethylene glycol preferably in an amount which is 5 percent of the ethylene glycol used.

The improved process is also applicable to making the diphenylalkylene homologs of p,p'-diisopropenyldiphenyl, which are made from the analogous diphenylalkylene homologs of p,p'-di-(alpha-hydroxy)isopropyldiphenyl, and the statements of reaction conditions made above hold true for the homologs also.

The requirements for the inert-boiling non-peroxide forming suspending medium, e.g. "Shell 140" solvent are, that it: (a) is immiscible with water, (b) is immiscible with ethylene glycol or whatever primary polyol of comparable boiling point is used, (c) has a boiling point high enough to bring about the melting and dehydration of the di-(alpha-hydroxy)isopropylphenyl compounds; and (d) is a satisfactory azeotropic "chaser" of both water and ethylene glycol. The suspending medium need not be a hydrocarbon since other types of solvents meeting these requirements can also be used. Most suitable solvents for the medium which meet the requirements will be found among refined petroleum solvents having a relatively low unsaturation content. As is apparent from the foregoing and from the examples, the dehydration step is performed without the use of any dehydration catalyst and is a non-catalytic process.

The entire process may be more fully illustrated by the following examples, which are not to be construed as limiting:

PREPARATION 1 p,p'-Diacetyldiphenyl

To a suspension of 7500 grams of anhydrous aluminum chloride in 9000 milliliters of carbon disulfide was added a solution of 4259 grams of acetyl chloride, 2277 grams of biphenyl (MW:154.2) and 4500 milliliters of carbon disulfide in the course of two hours, during which the temperature of the reaction mixture was kept below 25 degrees centigrade.

After refluxing for about eight hours, the excessive carbon disulfide was distilled off and the remaining solids were quenched cautiously and under continuous cooling with ice water. After the solids were suspended in an excess of water, they were collected on a Buechner filter, washed with water until free from hydrogen chloride, and dried in vacuo at 75 degrees centigrade. Upon repeated crystallization from acetone, 2085 grams of light yellow-colored shiny crystalline p,p'-diacetyldiphenyl were obtained of the melting point 191–193 degrees centigrade. The mother liquors have separated 815 grams of an additional crop of crystals of lesser purity; yield=83 percent of theory.

PREPARATION 2 p,p'-Di(alpha-hydroxy)isopropyldiphenyl

To six moles of methyl magnesium bromide in 4500 grams of absolute ether was added 596 grams of p,p'-diacetyldiphenyl, in small portions under stirring and occasional ice bath cooling, in the course of one hour.

This mixture was then heated gradually and, in the course of three hours, 3700 milliliters of toluene were introduced. During this heating period, practically all the removable ether was distilled off and the bath temperature eventually reached 125 degrees centigrade. The mixture was heated and stirred at this temperature for six hours. To this stirred batch was added cautiously and under ice bath cooling, a solution of 360 grams of ammonium chloride in 1200 milliliters of water. After completed addition of the ammonium chloride solution, the stirring was discontinued and the supernatant light yellow-colored toluene layer was decanted through a Buechner filter.

The remaining white solids were collected on the Buechner filter, washed with water until free from ammonium chloride and then dried. The toluene was separated from the aqueous layer of the filtrate (the latter discarded) and the toluene evaporated in vacuo, leaving a crop of light yellow solids. These dry solids were combined with the white solids isolated above, giving 738.1 grams of a light cream-colored crystalline powder, p,p'-di-(alpha-hydroxy) isopropyldiphenyl. No purification of this crude material is necessary. Since 676 grams would be a theoretical yield, the content of this crude is calculated as 91.6 percent of desired product.

PREPARATION 3 p,p'-Diacetyldiphenylmethane

To a suspension of 15.5 kilograms (116 moles of anhydrous aluminum chloride AlCl, in 22.7 kilograms of carbon disulfide was added a solution of 8.5 kilograms (108.4 moles) acetyl chloride, 6.05 kilograms (36 moles) of diphenyl methane in 9 kilograms of carbon disulfide. In the course of 4 hours under stirring and ice-salt brine cooling during the addition of the reagents, the inside temperature was kept in the neighborhood of +3° C.

The mixture was allowed to stand overnight, and the next morning carbon disulfide was recovered by distillation at a jacket temp. of about 58° C. After about 10 hours of heating at this temperature, the distillation of the carbon disulfide was completed; the residue of the reaction mixture was cooled with well water and quenched by the addition of crushed ice. After isolating the reaction mixture on a Buechner funnel under mild suction, the solids were washed with an excess of water. Soon the oily particles of the reaction mixture have penetrated the filter medium and reappeared forming a liquid second phase in the aq. filtrate which was subsequently discarded. The crude solids were air dried weighing 8.1 kilograms. Upon recrystallization from acetone, totally 6.173 kilograms of pure diketone, p,p'-diacetyldiphenylmethane,, M.P. 88–90° C. were obtained, yield: 77.1 percent of the theory. The diketone has been identified by oxime-titration, according to Smith, D. M. and Mitchell, J. Jr. Anal. Chem. 22:750 (1950).

PREPARATION 4 p,p'-Di-(alpha-hydroxy)isopropyldiphenylmethane

To 18.9 liters of an etheric solution containing 63 moles of CH$_3$MgBr stirred in a jacketed reaction kettle was added a suspension of 6 kilograms of p,p'-diacetyldiphenylmethane in 59.5 liters of benzene. The addition of the slurry was complete within 4 hours while the temperature of the jacket-cooled kettle was kept below +22° C. The temperature of the jacket was then raised and kept at 85° C. for the next 15 hours during which period the ether and most of the benzene was distilled off. Upon cooling, the reaction mixture was quenched with about 200 pounds of chopped ice and by the gradual addition of a solution of 3.6 kilograms of NH$_4$Cl in 12 liters of soft water. The mixture was allowed to stand for 1 hour when the greatest part of the aqueous layer could be separated from the benzene solution. The solids suspended in the aqueous layer were isolated by filtration and washed subsequently with water. The remaining benzene solution was then distilled is vacuo at a jacked temperature of 42° C. to a pasty consistency. To the mixture was then added 6 liters of water and the last traces of benzene were removed by distillation in vacuo. Upon cooling about 60 pounds of chopped ice were added to the reaction mixture permitting the separation of the low melting solids by filtration on a Buechner. After washing the off-white colored powdery solids with water and drying totally 7.357 kilos of crude Diol p,p'-di-(alpha-hydroxy) isopropyl diphenylmethane were obtained. 6000 gm. of starting diketone could produce a theoretical maximum yield of $$\frac{284}{252} \times 6000 = 6760 \text{ gms. of Diol.}$$

The crude Diol of 7.357 kg. is containing therefore not more than $$\frac{6760}{7357} \times 100 = 91.8 \text{ percent of pure Diol}$$

One gram of this crude Diol was recrystallized from the mixture of 4 cc. of benzene and 0.4 cc. of cyclohexane, giving 0.065 gm. of pure Diol (white crystals) melting point 70–1° C.

PREPARATION 5 p,p'-Diacetyl diphenylethane

To a suspension of 133.34 grams (1.0 mole) of anhydrous aluminum chloride in 150 cc. of CS$_2$, a solution of 78.5 grams of acetyl chloride, and 54.6 grams (0.3 mole) of dibenzyl in 100 cc. of CS$_2$, was added under ice cooling in the course of 1 hour. After distillation of the solvent and decomposition of the residual with ice, the crude brown precipitate was collected on a Buechner funnel. The 115 grams of crude were recrystallized from 2300 cc. of acetone under charcoaling there were obtained 45.9 grams of crystals melting at 166–7° C. Upon concentration of the mother liquor, 5 grams of crystals were obtained melting point 165–6° and bringing the total yield of p,p'-diacetyl diphenylethane to 50.9 grams, or 63.8 percent of the theory.

PREPARATION 6 p,p'-Di-(alpha-hydroxy) isopropyldiphenylethane

To 80 cc. of 3 molar CH$_3$MgBr solution in ether was added, in the course of 15 minutes under stirring and ice cooling, a suspension of 26.6 grams (0.1 mole) of p,p'-diacetyl dibenzyl in 250 cc. of benzene. Upon heating the mixture for one hour, an additional 250 cc. benzene were introduced and the mixture was refluxed for 3 hours. The reaction mixture was then cooled, decomposed with ice first and with a solution of 24 grams of NH$_4$Cl in 80 cc. of water thereafter; the precipitated white solids were collected on a filter. After washing of the precipitate with plenty of water and drying in the air, 24.1 grams of crude diol were obtained. This crude product was recrystallized from 240 cc. of boiling benzene under filtration yielding 17.1 grams of pure diol p,p'-di-(alpha-hydroxy) isopropyldiphenylethane melting at 134–6° C.=57.4 percent yield of the theory.

PREPARATION 7 p,p'-Diacetyldiphenyl butane (A) Reacting 1.70 moles of 48 percent HBr in 2.37 moles of conc. sulfuric acid with 54 gms. (.3 moles) of 1,4-butane diol according to Nenitzescu and Necsoiu, JACS 72:3473 (1950), we have obtained 1,4-dibromo butane of $$n_D^{26°} = 1.5140 \text{ and } d\frac{26°}{20°} = 1.7906$$

(B) Then, using a method similar to the one described by J. F. Sirks, cf. C.A. 38:2311 (1944), a solution of bromobenzene and 1,4-dibromobutane were reacted in ether with metallic sodium to give 1,4-diphenyl butane, melting 50–52°, after recrystallization from hexane.

(C) Then, reacting 44.6 gms. (0.334 mole) of anhydrous aluminum chloride with a solution of 26.2 gms (0.334 mole) acetyl chloride, and 16 gms. (.0762 mole) of 1,4-diphenyl butane in 90 cc. of carbon disulfide, there were obtained 22.4 gms of crude solid diketone. Upon recrystallization from acetone the white crystalline p,p'-diacetyl-1,4-diphenylbutane, m. 100–2° was obtained.

PREPARATION 8 p,p'-Di-(alpha-hydroxy) isopropyldiphenyl-1,4-butane

Then, reacting 9.8 gms. (0.033 mole) of p,p'-diacetyl-1,4-diphenylbutane with .08 mole of a 3 mole etheric solution of methyl magnesium bromide and carrying out the Grignard reaction with 167 cc. of benzene as a solvent upon decomposition by the method of Preparation 4, there was obtained 12.53 gms. of white solids, representing crude diol. The theoretical yield is calculated to be 10.87 gms. Thus, the crude diol may contain not more than 86.6 percent pure diol, p,p'-di-(alpha-hydroxy)isopropyldiphenyl-1,4-butane.

EXAMPLE 1 p,p'-Diisopropenyldiphenyl

To 100 grams of the crude p,p'-di-(alpha-hydroxy) isopropyldiphenyl from Preparation 2 and one gram of polymerization inhibitor (2,6-di-tert-butyl-para-cresol) were added 200 milliliters of "Shell 140" solvent (a pure petroleum fraction of the boiling range of about 200 degrees centigrade) in a well-stirred, two-liter, three-neck flask placed in a high boiling fat bath of 210 degrees centigrade. While stirring at this temperature, audible dehydration took place in the course of an hour and soon petroleum along with water began to distill. The water of the dehydration was carried over azeotropically by the petroleum fraction. As soon as the distillation of water was completed, 400 milliliters of preheated (to 190° C.) ethylene glycol (containing .12 gram of the same polymerization inhibitor) were added dropwise very cautiously. (The slow addition of the hot ethylene glycol is necessary for the removal of the remainder of the mineral oil fraction azeotropically.) As soon as the mineral oil fraction distilled over completely, the temperature of the bath was elevated to 240 degrees centigrade and the addition of the first batch of ethylene glycol could be completed.

At this point, 3200 milliliters of preheated (to 190° C.) anhydrous ethylene glycol, containing .96 gram of the above polymerization inhibitor and 640 grams of a heat-stable polyalcohol (Mannitol) was added in small portions in order to drive over the pure p,p'-diisopropenyldiphenyl by azeotropic distillation. The temperature of the bath was about 270 degrees centigrade during the main course of distillation and sufficient ethylene glycol was always added in order to prevent the contents of the round bottom flask from drying out or over-heating.

In the course of another three hours, the distillation was completed and, upon cooling, the shiny white crystalline plates of pure product were collected on a Buechner funnel. The ethylene glycol was recovered by filtration and the crystals washed with ample amounts of water. A yield of 46.3 grams (59.4 percent) of essentially pure p,p'-diisopropenyldiphenyl was obtained, melting at 182–185 degrees centigrade.

EXAMPLE 2 p,p'-Diisopropenyldiphenylmethane

To 300 grams of crude diol, p,p'-di-(alpha-hydroxy) isopropyldiphenylmethane, from Preparation 4 (containing a maximum of 91.8 percent pure diol) and 3 grams of 2,6-di-tert-butyl-para-cresol inhibitor, were added 600 cc. of a petroleum fraction (Shell Solvent "140", b. range 185–210°) in a 3-neck flask equipped with a distilling head and heated in a bath of about 210° C. While stirring at this bath temperature audible dehydration took place and was completed in the course of one hour; the theoretical amount of water was carried over by the petroleum fraction azeotropically. Hot ethylene glycol (400 cc.) was then introduced cautiously into the mixture. As the remaining petroleum fraction was removed azeotropically the temperature of the bath was raised gradually. There was added a hot solution of 45 gram LiCl in 900 cc. ethylene glycol, the fraction changed and the azeotropical distillation of the p,p'-diisopropenyldiphenylmethane, started. The temperature of the bath was kept around 240° C. and hot ethylene glycol was added continuously in order to replace the carrier distilled; totally about 18,900 cc. of ethylene glycol were added. The yield was 178.8 gram of pure p,p'-diisopropenyldiphenylmethane, M.P. 50–2° C.; bromine titration revealed the presence of 92.2 percent unsaturation.

Assuming the maximum theoretical content of the crude starting material as 91.8 percent, 276 gram, pure diol should furnish 241 gram of end-product, and the obtained amount of p,p'-diisopropenyldiphenylmethane, thus represents 74.2 percent yield of the theory.

EXAMPLE 3 p,p'-Diisopropenyldibenzyl [alternatively named 4,4'-diisopropenyl-diphenyl ethane]

7.5 grams of p,p'-di-(alpha-hydroxy) isopropyldiphenylethane (Prep. 6) m. 134–6° C. were dehydrated by the method of Example 2 using 50 cc. of a petroleum fraction (B. 185–210° C.) in the presence of 80 mg. of 2,6-di-tert-butyl-para-cresol inhibitor in the course of ½ hour. Upon addition of 30 cc. ethylene glycol the petroleum faction was removed azeotropically when 30 cc. of glycol containing 1.5 grams of LiCl were added and the azeotropic distillation of the product was begun. Totally, 460 cc. of glycol were used to distill 5.62 grams of p,p'-diisopropenyldibenzyl, alternatively named p,p'-diisopropenyldiphenyl-1,2-ethane [alternatively named 4,4'-diisopropenyl-diphenyl ethane] (m. 124–6° C.). The yield is 85 percent of the theory.

EXAMPLE 4 p,p'-Diisopropenyldiphenyl-1,4-butane 5 grams (0.0154 mole) of p,p'-di-(alpha-hydroxy) isopropyldiphenyl-1,4-butane (Prep. 8) were dehydrated azeotropically by the procedure of Example 2 using 25 cc. of the petroleum fraction, 110 cc. ethylene glycol and 3 grams of anhydrous lithium chloride. There was obtained 2.06 grams of p,p'-diisopropenyl-1,4-diphenyl butane, melting point 53–55° C. yield=(assuming the 100 percent yield for the proceeding step) 53.3 percent of the theory.

Following the procedure of the foregoing examples, other diisopropenyldiphenyl alkylene homologs were prepared, among which were those wherein the alkylene bridge in the formula in column 1 is a branched one, such as:

$$C(C_2H_5)(C_2H_5)C(C_3H_7)(C_3H_7)$$
$$CH_2CH(C_4H_9)CH_2$$

and
$$CH_2CH_2C(C_2H_5)(C_2H_5)C(CH_3)(CH_3)CH_2$$

The diisopropenyldiphenyl alkylene homologs may be used as cross-linking agents for polystyrene etc., forming copolymers, by conventional methods or by the method described in my copending application Serial No. 439,875 filed June 28, 1954, entitled "Batchwise Copolymerization Technique" now U.S. Patent 2,810,716.

Very small (1.3–1.8 percent) amounts of the diisopropenyldiphenyl alkylene homologs may be copolymerized with 2-vinylpyridine to form swellable resins, which are useful as appetite depressants, as shown in my copending application Serial No. 671,128, for "Appetite Depressant" filed even date herewith, for p,p'-diisopropenyldiphenylmethane.

It is to be understood that the invention is not to be limited to the exact details of operation and compounds shown and described as obvious modifications and equivalents will be apparent to those skilled in the art, and the invention is therefore to be limited only by the scope of the appended claims.

I claim:

1. The non-catalytic dehydration process which includes admixing a compound having the formula

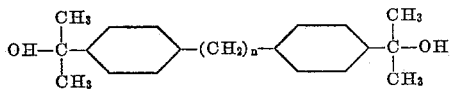

wherein n is an integer from 0–10, inclusive, and, an inert high-boiling non-peroxide forming refined petroleum hydrocarbon solvent in a reaction zone; heating the admixture to dehydrate the starting compound; distilling off a major portion of the solvent-water of dehydration fraction from said admixture; slowly adding preheated anhydrous ethylene glycol to the reaction zone while distilling off the balance of the solvent fraction; slowly adding additional preheated anhydrous ethylene glycol to the reaction zone while distilling off the ethylene glycol fraction which contains the desired product having the formula

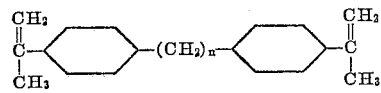

wherein n is the same cardinal number as above; collecting the distillate, and recovering the desired product therefrom.

2. The non-catalytic dehydration process of claim 1 wherein the ethylene glycol and the inert high-boiling non-peroxide forming solvent each contain a small amount of a polymerization inhibitor.

3. The non-catalytic dehydration process of claim 2 wherein the ethylene glycol contains a small amount of a heat stable poly-alcohol.

4. The non-catalytic dehydration process of claim 2 wherein the ethylene glycol contains a small amount of a heat stable, anhydrous inorganic salt.

5. The non-catalytic dehydration process which includes: admixing p,p' - di - (alpha - hydroxy)isopropyldiphenyl, a small amount of a polymerization inhibitor, and an inert high-boiling non-peroxide forming refined petroleum hydrocarbon solvent in a reaction zone; heating the admixture to dehydrate the p,p'-di-(alpha-hydroxy)isopropyldiphenyl; distilling off a major portion of the solvent-water of dehydration fraction of the admixture; slowly adding preheated anhydrous ethylene glycol and a small amount of a polymerization inhibitor to the reaction zone while distilling off the balance of the solvent fraction; slowly adding preheated anhydrous ethylene glycol containing a small amount of polymerization inhibitor to the reaction zone, while distilling off the ethylene glycol fraction which contains the desired p,p'-diisopropenyldiphenyl and collecting the distillate; and, separating the p,p'-diisopropenyldiphenyl from the distillate.

6. The non-catalytic dehydration process which includes: admixing p,p' - di - (alpha - hydroxy)isopropyldiphenyl, a small amount of a polymerization inhibitor, and an inert high-boiling non-peroxide forming refined petroleum hydrocarbon solvent in a reaction zone; heating the admixture to dehydrate the p,p'-di-(alpha-hydroxy)isopropyldiphenyl; distilling off a major portion of the solvent-water of dehydration fraction of the admixture; slowly adding preheated anhydrous ethylene glycol and a small amount of a polymerization inhibitor to the reaction zone while distilling off the balance of the solvent fraction; slowly adding preheated anhydrous ethylene glycol, a small amount of polymerization inhibitor and heat-stable anhydrous inorganic salt soluble in ethylene glycol to the reaction zone while distilling off the ethylene glycol fraction which contains the desired p,p'-diisopropenyldiphenyl and collecting the distillate; and, separating the p,p'-diisopropenyldiphenyl from the distillate.

7. The non-catalytic dehydration process which includes: admixing a diisopropenyldiphenyl-lower alkylene homolog of p,p'-di-(alpha-hydroxy)isopropyldiphenyl, a small amount of a polymerization inhibitor and an inert high-boiling non-peroxide forming refined petroleum solvent in a reaction zone; heating the admixture to dehydrate the starting homolog of 4,4'-di-(alpha-hydroxy)-isopropyldiphenyl; distilling off a major portion of the solvent-water of dehydration fraction of the admixture; slowly adding preheated anhydrous ethylene glycol containing a small amount of a polymerization inhibitor to the reaction zone while distilling off the balance of the solvent fraction; slowly adding additional preheated anhydrous ethylene glycol containing a small amount of polymerization inhibitor to the reaction zone, while distilling off the ethylene glycol fraction which contains the desired product, which is the diisopropenyldiphenyl-lower-alkylene homolog of p,p'-diisopropenyldiphenyl, and collecting the distillate; and, separating the desired product therefrom.

8. The non-catalytic dehydration process of claim 7 wherein the additional preheated anhydrous ethylene glycol also contains a small amount of lithium chloride.

9. The non-catalytic dehydration process of claim 8 wherein the starting homolog is p,p'-di-(alpha-hydroxy)-isopropyldiphenylmethane, and the desired product recovered is p,p'-diisopropenyldiphenylmethane.

10. The non-catalytic dehydration process of claim 8, wherein the starting homolog is p,p'-di-(alpha-hydroxy)-isopropyldiphenyl-1,2-ethane, and the desired product recovered is p,p'-diisopropenyldiphenyl-1,2-ethane.

11. The process of claim 8, wherein the starting homolog is p,p'-di-(alpha-hydroxy)isopropyldiphenyl-1,4-butane, and the desired product recovered is p,p'-diisopropenyldiphenyl-1,4-butane.

References Cited in the file of this patent

UNITED STATES PATENTS

| | | |
|---|---|---|
| 2,068,010 | Dreyfus | Jan. 19, 1937 |
| 2,465,486 | Rosenthal | Mar. 29, 1949 |
| 2,474,735 | Harmon | June 28, 1949 |
| 2,496,207 | Handlos et al. | Jan. 31, 1950 |
| 2,634,302 | Seymour et al. | Apr. 7, 1953 |

FOREIGN PATENTS

| | | |
|---|---|---|
| 495,419 | Canada | Aug. 18, 1953 |

UNITED STATES PATENT OFFICE
CERTIFICATION OF CORRECTION

Patent No. 2,957,036                  October 18, 1960

Richard L. Markus

It is hereby certified that error appears in the above numbered patent requiring correction and that the said Letters Patent should read as corrected below.

Column 2, line 37, for "inert-boiling" read -- inert high-boiling --.

Signed and sealed this 4th day of July 1961.

(SEAL)
Attest:

ERNEST W. SWIDER                           DAVID L. LADD
Attesting Officer                             Commissioner of Patents